(12) United States Patent
Bodrie

(10) Patent No.: US 9,848,582 B2
(45) Date of Patent: Dec. 26, 2017

(54) COLLARS WITH INTEGRATED LEASHES

(71) Applicant: Victor Bodrie, Northville, MI (US)

(72) Inventor: Victor Bodrie, Northville, MI (US)

(*) Notice: Subject to any disclaimer, the term of this patent is extended or adjusted under 35 U.S.C. 154(b) by 126 days.

(21) Appl. No.: 14/873,940

(22) Filed: Oct. 2, 2015

(65) Prior Publication Data
US 2016/0095298 A1 Apr. 7, 2016

Related U.S. Application Data

(60) Provisional application No. 62/071,748, filed on Oct. 2, 2014.

(51) Int. Cl.
*A01K 27/00* (2006.01)

(52) U.S. Cl.
CPC .......... *A01K 27/001* (2013.01); *A01K 27/003* (2013.01)

(58) Field of Classification Search
CPC ............................ A01K 27/001; A01K 27/003
USPC .................. 119/792, 795, 793, 797, 798
See application file for complete search history.

(56) References Cited

U.S. PATENT DOCUMENTS

| | | | | |
|---|---|---|---|---|
| 5,718,189 A | * | 2/1998 | Blake .................. | A01K 27/003 119/770 |
| 7,103,943 B2 | * | 9/2006 | Lambert ................ | A01K 27/00 119/792 |
| 7,281,495 B2 | * | 10/2007 | Wagner ................ | A01K 27/001 119/793 |
| 8,327,808 B2 | * | 12/2012 | Chirico .................. | A01K 27/00 119/792 |
| 2006/0042562 A1 | * | 3/2006 | Wagner ................ | A01K 27/001 119/792 |
| 2013/0047935 A1 | * | 2/2013 | Pieper .................. | A01K 27/006 119/792 |
| 2013/0269628 A1 | * | 10/2013 | Holt, Jr. ................ | A01K 27/001 119/792 |
| 2014/0033992 A1 | * | 2/2014 | Reed .................... | A01K 27/001 119/792 |
| 2015/0020751 A1 | * | 1/2015 | Pattie .................. | A47D 13/086 119/770 |

* cited by examiner

*Primary Examiner* — Richard Price, Jr.
(74) *Attorney, Agent, or Firm* — Varnum, Riddering, Schmidt and Howlett LLP

(57) ABSTRACT

A collar assembly includes a main body configured in an uninterrupted loop, the main body having an outer surface, an elongated body extending away from the main body, the elongated body configured to at least partially wrap around and connect to the outer surface of the main body and the elongated body having a holding portion thereby allowing a user to use the elongated body as a leash.

20 Claims, 5 Drawing Sheets

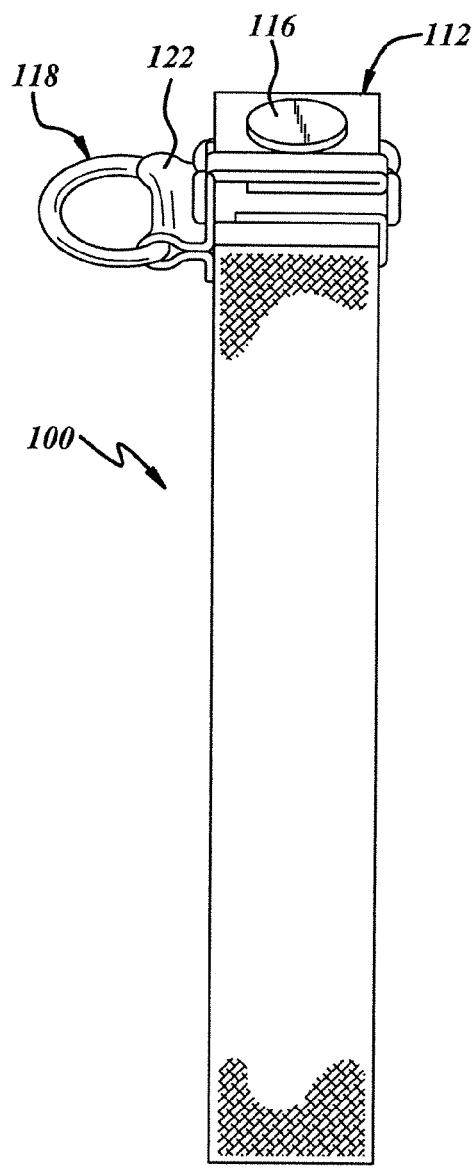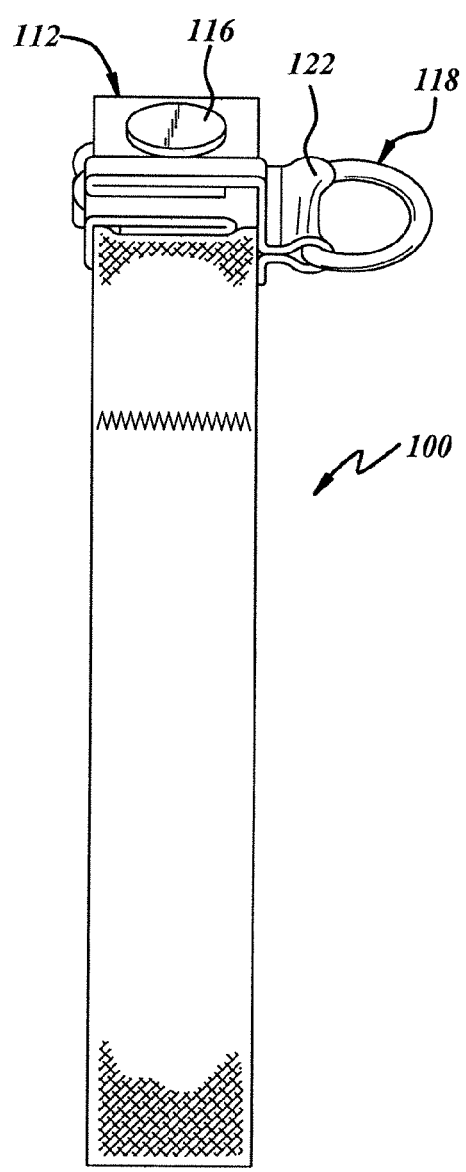
*FIG. 5*  *FIG. 6*

COLLARS WITH INTEGRATED LEASHES

CROSS-REFERENCE TO RELATED APPLICATIONS

This application claims priority of U.S. Provisional Application 62/071,748 filed Oct. 2, 2014, the contents of which are incorporated herein by reference.

FIELD OF THE INVENTION

The present specification relates generally to animal collars. Specifically, the present specification relates to an animal collar having an integrated leash.

BACKGROUND OF THE INVENTION

Collars for animals, such as dogs, are well known in the art. While these collars are typically configured to removably connect to a leash, the prior art does not teach an integrated leash within the collar assembly. Accordingly, there exists a need in the art to provide for a collar having an integrated leash allowing the user to quickly gain access to the functionality of the leash when an auxiliary leash is not available.

SUMMARY OF THE INVENTION

In one embodiment, the collar assembly includes a main body configured in an uninterrupted loop, the main body having an outer surface, an elongated body extending away from the main body, the elongated body configured to at least partially wrap around and connect to the outer surface of the main body and the elongated body having a holding portion thereby allowing a user to use the elongated body as a leash.

In another embodiment, the collar assembly includes a main body having an elongated body extending therefrom, the main body made of a flexible material, the elongated body directly connected to the main body. The main body is configured to adjust around the neck of an animal. the elongated body being wrappable and connectable around and to the main body thereby allowing the main body to secure and adjust around the neck of an animal, the elongated body wrapping around and connecting to the main body in a first position and the elongated body unconnected and unwrapped from the main body thus allowing the elongated body to be used as a leash.

Either of the collar assemblies disclosed above may also include an adjustment mechanism to allow the main body to be adjustable. Further, a slide may be provided fixedly connected to the main body, the slide positioned adjacent to the adjustment mechanism so as to prevent choking of the animal when the elongated body is in a use position. To support the leash functionality, a distal end of the elongated body includes the holding portion provided thereon.

To connect the elongated body to the main body, a first connector is provided connected to the holding portion, the first connector configured to connect the elongated body to the main body. A second connector is provided connected to the main body, the second connector configured to connect the elongated body to the main body.

At least one connector is provided connected to either the main body or the elongated body so as to connect the elongated body to the main body.

Further, since the collar assembly is to be primarily used as a leash, a connector allowing for connection of an auxiliary leash to the collar is also provided connected to the collar assembly.

In both embodiments, a first position is defined when the elongated body is wrapped around the outer surface of the main body, the first position further defined when a free end of the elongated body is connected to the main body. A second position is defined when the free end of the elongated body is disconnected from the main body, the second position further defined when the elongated body is unwrapped from the main body wherein the elongated body is capable of being used as a leash.

A method using the present animal collar may me used including the steps of disconnecting a free end of the elongated body from the main body and unwrapping the elongated body from the around the main body thereby allowing a user to use the elongated body as a leash. The method may further include the steps of rewrapping the elongated body around the main body and connecting the elongated body to the main body.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5 illustrates an alternative side view of the collar assembly in accordance with one or more embodiments of the present invention;

FIG. 6 illustrates yet another alternative side view of the collar assembly in accordance with one or more embodiments of the present invention;

DETAILED DESCRIPTION OF THE PREFERRED EMBODIMENTS

The present specification is directed towards a collar assembly having a main body (collar) and an elongated body (leash) extending therefrom. The main body is generally circular and arranged and configured to be positioned around an animal neck, specifically a dog. The elongated body is connected to the main body and extends away from the main body and is used as a leash when in the functional position. When in an unused position, the elongated body wraps around the main body and connects to the main body. When the user needs to use a leash, the user unconnects the elongated body from the main body and unwraps the elongated body from the main body to use the elongated body as a leash. To restow the leash, the user simply wraps the elongated body around the main body and secures the elongated body back to the main body.

Figure 1:
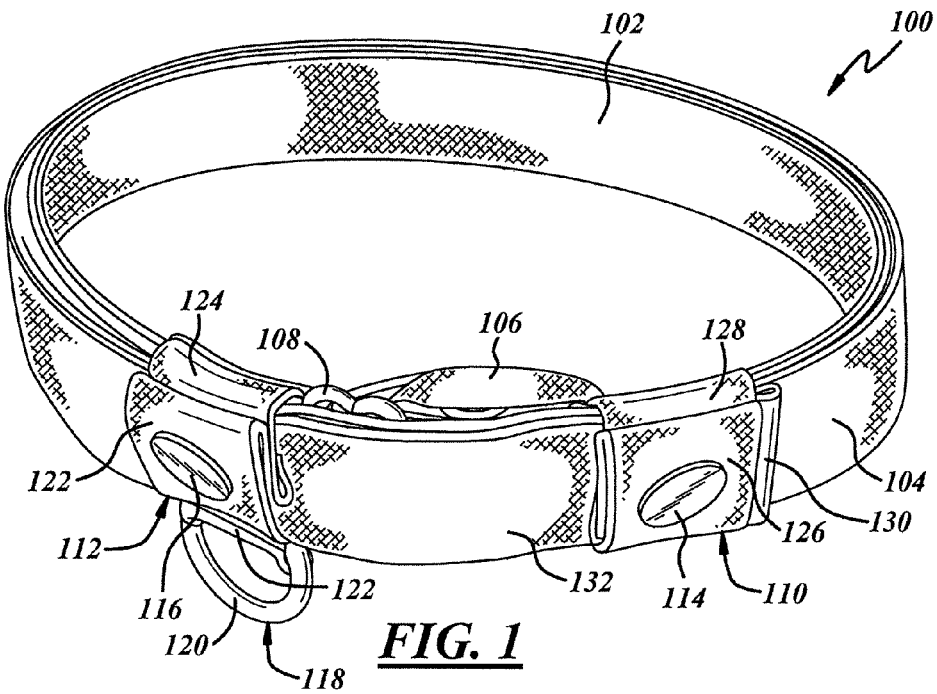
FIG. 1 illustrates a perspective view of the collar assembly in accordance with one or more embodiments of the present specification.

FIG. 1 illustrates the collar assembly 100 having a main body 102 (collar) and an elongated body 104 (leash). The main body 102 is in a generally circular form and includes an adjuster 106. The adjuster 106 allows the user to adjust the size of the main body 102 to accommodate the neck of the animal. The adjuster 106 is positioned adjacent to the slide 108. The strap exiting the adjuster 106 enters the slide 108 and continues to form the main body 102.

Figure 2:
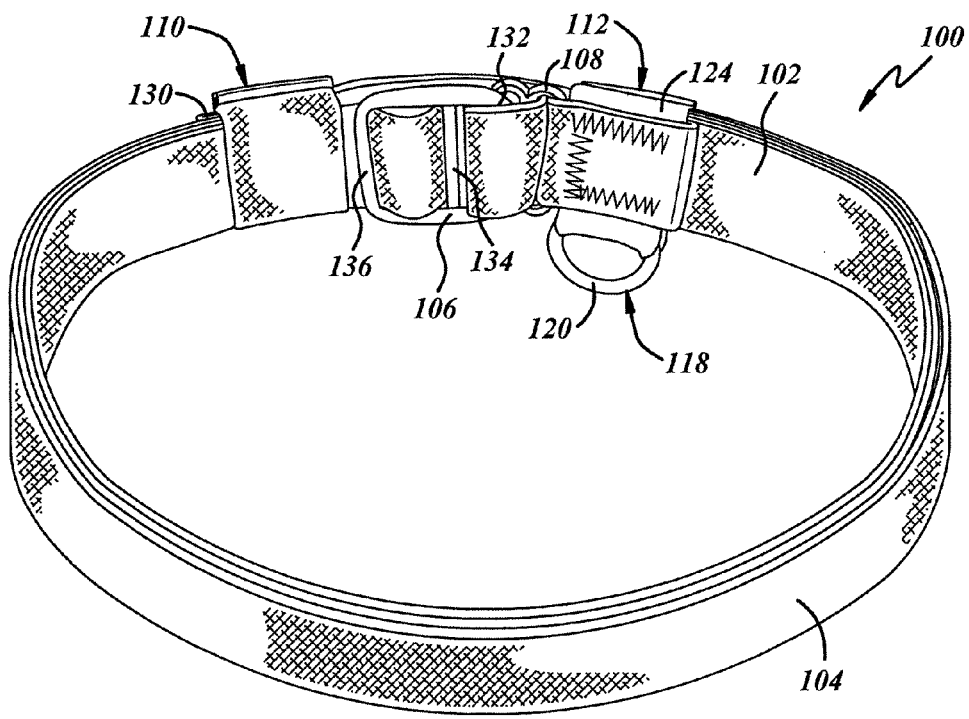
FIG. 2 illustrates an alternative perspective view of the collar assembly in accordance with one or more embodiments of the present invention.

The adjuster 106 is commonly made of a plastic or polymer type material. However, the adjuster 106 may alternatively be made out of a metal. Similarly, the slide 108 is made of metal that may alternatively may be made of a plastic or polymer type material. The adjuster 106 includes a center crossbeam 134, such as illustrated in FIG. 2. A second side beam 136 is further provided to facilitate adjustment and locking of the main body 102.

The adjuster 106 is placed adjacent to the slide 108. The shared strap between the adjuster 106 and the slide 108 prevent the elongated body 104 from choking the animal when the elongated body unwrapped and in use. The slide 108 is permanently connected to a portion of the main body 102. The slide 108 acts as a lock and stop for the adjuster 106 during use of the elongated body 104 so as to prevent choking of the animal wearing the collar assembly 100.

As illustrated in FIGS. 1 and 2, connector subassemblies 110, 112 are provided fixedly connected to the main body 102. In the present embodiment, the connectors 110, 112 are strap assemblies having at least one snap. The connector subassembly 110 includes a snap 114 connected to a flap 130. The snap 114 connects to a subsnap connected to the flap 128. In the present embodiment, the connector 110 is adapted to hold the distal end 130 of the elongated body 104.

Similarly, the connector 112 includes a snap 116. The snap 116 is connected to a flap 122 which connects to a second flap 124. The connector 112 and corresponding flaps 122, 124 are configured to securely hold a portion of the elongated body 104. In the present embodiment, the connector 110 is directly connected to the elongated member 104. Specifically, the connector 110 is connected to a distal end 130 of the elongated body 104. Even further, the connector 110 is connected to a handle portion 132 of the elongated body 104.

Figure 3:
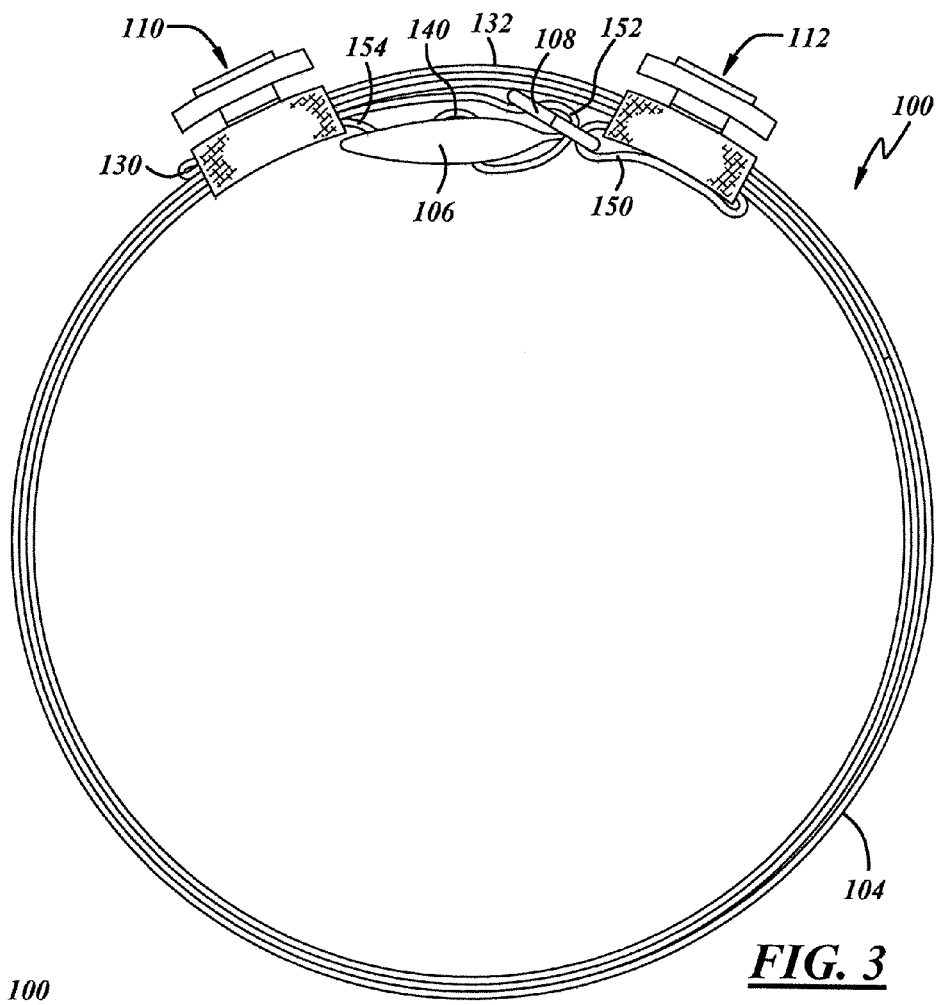
FIG. 3 illustrates a top view of the collar assembly in accordance with one or more embodiments of the present invention.
Figure 4:
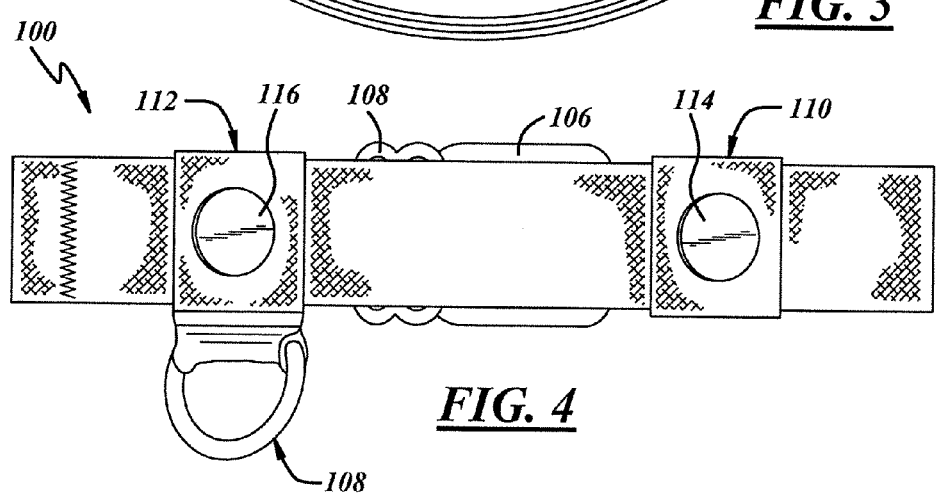
FIG. 4 illustrates a side view of the collar assembly in accordance with one or more embodiments of the present invention.

FIGS. 3-6 illustrate the collar assembly 100 in a wrapped position. In the wrapped position, or first position, the elongated body 104 is wrapped around an outer surface of the main body 102. The elongated body 104 is wrapped around the main body 102 in a close configuration so as to overlap the main body 102. Little to no space is positioned between the layers of the wrapped elongated body 104 when it is in a first position, such as illustrated in FIG. 3.

In one embodiment, such as illustrated in FIG. 3, the elongated body 104 wraps around the main body 102 at least three times. The wrapping of the elongated body 104 around the main body 102 provides further stiffness of the overall collar assembly when worn by a dog. The wrapping provides for strength and structure of the overall collar assembly when in a general use position, such as illustrated in FIG. 3.

Figure 7:
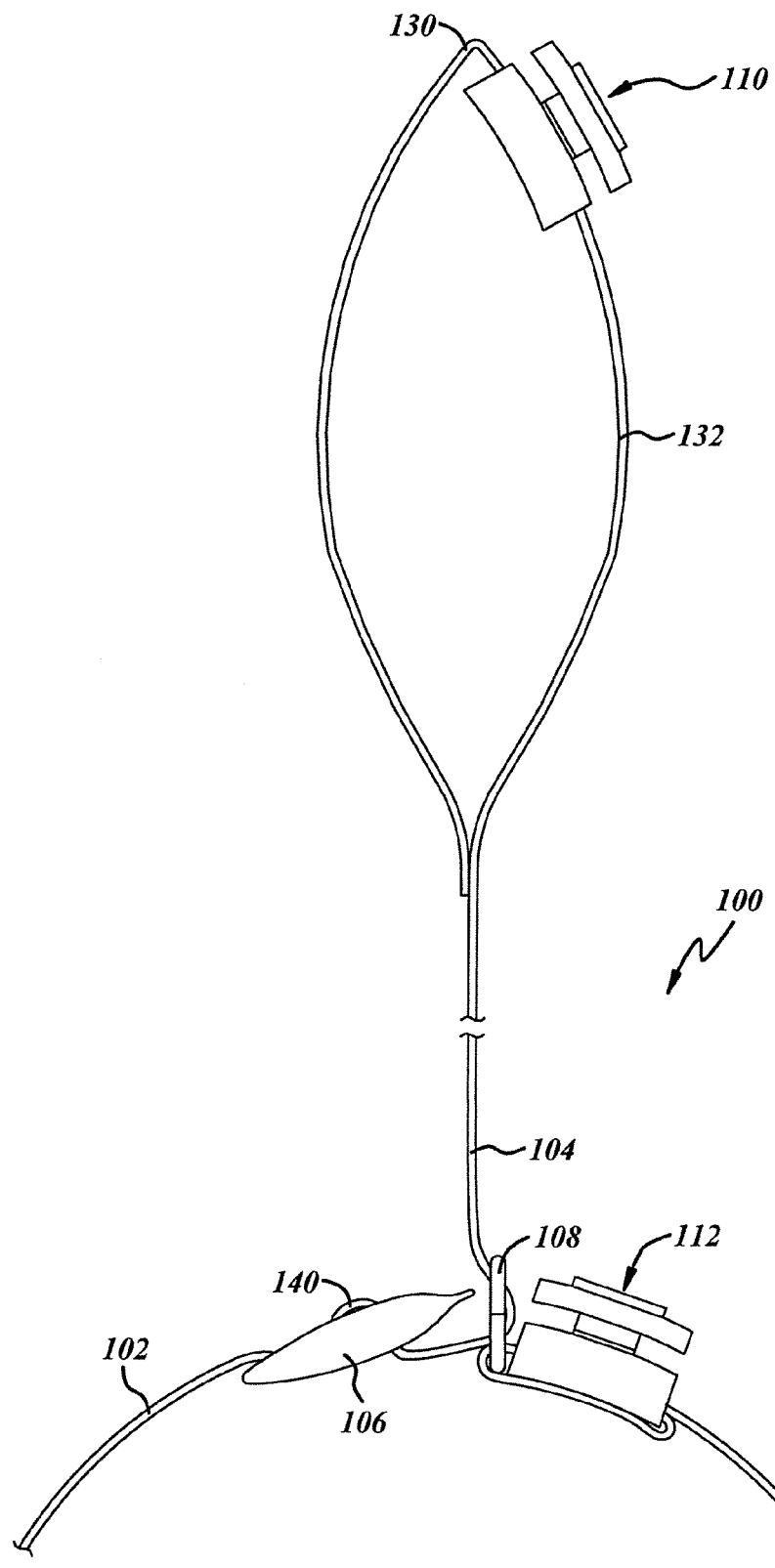
FIG. 7 illustrates the collar assembly in an unwrapped position from a top view in accordance with one or more embodiments of the present specification.
Figure 8:
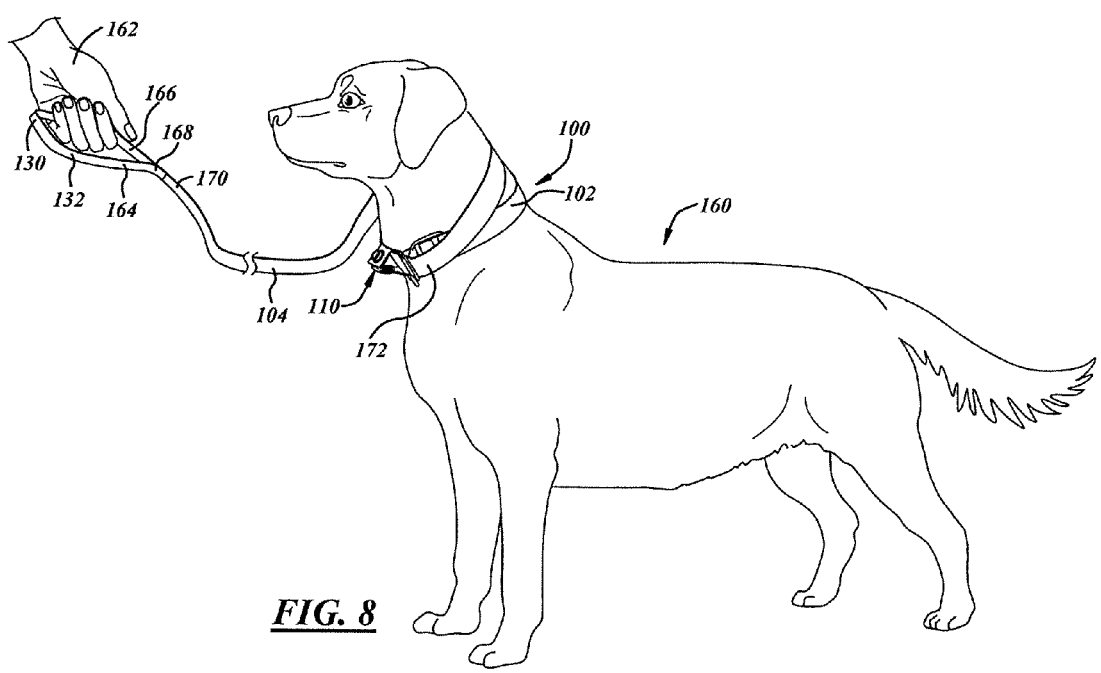
FIG. 8 illustrates an environmental view of the collar assembly in an unwrapped position in accordance with one or more embodiments of the present specification.

The collar assembly 100 is intended for continuous use around a dog's neck. Specifically, the collar 100 is intended for constant use as a collar and use as a collar/leash only when necessary. By way of example, if a user and a dog are on a road trip but the user forgot a leash, the leash may be unwrapped to a second position, such as illustrated in FIGS. 7 and 8, thereby allowing the user to use the collar assembly 100 also as a leash.

FIGS. 5 and 6 illustrate alternative side views of the collar assembly 100. A D ring, or connector 18, is provided fixedly connected to the main body 102 of the collar assembly 100. Alternatively, the connector 118 may be connected to the elongated body 104. The connector 118 is securely connected to the main body 102 so as to allow for an auxiliary leash to be attached thereto. An auxiliary leash, not shown, can be used anytime the elongated body 104 is not in use as a leash.

In one embodiment, the main body 102 and the elongated body 104 are made of a one piece, or monolithic, construction. Put another way, the main body 102 and the elongated body 104 are made from the same elongated piece of material but separated at the point of adjustment, or connection where the elongated member then includes the distal end 130.

In other embodiments, the elongated body 104 is a separate piece of material and sewed or otherwise connected to the main body 102.

The main body 102 and the elongated body 104 are made of, in a preferred embodiment, a lightweight polypropylene strap. In other embodiments, the main body 102 and the elongated body 104 may be made from any web, strap, fabric, polymer, weaved material, or other configuration having sufficient strength for use as a collar and/or a leash.

An advantage of the present embodiment is that the collar assembly 100 is intended for use as a primary collar having a built in emergency or backup leash. The collar assembly 100 is to be worn by the dog, or other animal, all of the time and used with an auxiliary leash unless the user happens to forget the auxiliary leash. If the user forgets an auxiliary leash, the elongated body 104 unwraps to the second position such as illustrated in FIG. 7 thereby allowing the user to use the elongated body 104 as a leash.

FIG. 8 illustrates an environmental view of a dog 160 wearing the collar assembly 100. FIG. 8 specifically illustrates a midpoint between the first position and the second position where a user 162 is in the process of unwrapping the elongated body 104 from the main body 102. In this midpoint, such as illustrated in FIG. 8, the elongated body 104 is still partially wrapped around the main body 102 and thus still partially wrapped around the dog 160. As the user 162 continues to pull on the elongated body 104, the main body 102 will rotate around the dog 160 until the elongated body 104 reaches a fully elongated position, similar to what is shown in FIG. 7. Once in the second position where the elongated body 104 is in a fully extended position, the elongated body 104 may be used as a leash by the user 162.

The elongated body 104 includes a holding portion 166 provided at the distal end 130 of the elongated body 104. The holding portion 166 may include connecting strap portions 132 having an outer surface 164. The handle portion 166 connects to the elongated body 104 at a connection point 168. The connection point 168 is provided at a first end 170 of the elongated body 104. A second end 172 of the elongated body 104 connects to the main body 102.

A method using the present animal collar includes the steps of disconnecting a free end of the elongated body from the main body and unwrapping the elongated body from the around the main body thereby allowing a user to use the elongated body as a leash. The method may further include the steps of rewrapping the elongated body around the main body and connecting the elongated body to the main body.

It is noted that the teams "substantially" and "about" may be utilized herein to represent the inherent degree of uncertainty that may be attributed to any quantitative comparison, value, measurement, or other representation. These terms are also utilized herein to represent the degree by which a qualitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

I claim:

1. An animal collar comprising:
   a main body configured in an uninterrupted loop, the main body having an outer surface;
   an elongated body extending away from the main body, the elongated body continuously wrapped fully around the main body, the elongated body wrapped around the main body in a single consistent direction, the elongated body adapted to connect to the outer surface of the main body wherein the elongated body is unrolled; and
   the elongated body having a holding portion thereby allowing a user to use the elongated body as a leash.

2. The animal collar of claim 1 wherein an adjustment mechanism is provided to allow the main body to be adjustable.

3. The animal collar of claim 2 wherein a slide is provided fixedly connected to the main body, the slide positioned adjacent to the adjustment mechanism so as to prevent choking of the animal when the elongated body is in a use position.

4. The animal collar of claim 1 wherein the distal end of the elongated body includes the holding portion provided thereon.

5. The animal collar of claim 4 wherein a first connector is provided connected to the holding portion, the first connector configured to connect the elongated body to the main body.

6. The animal collar of claim 5 wherein a second connector is provided connected to the main body, the second connector configured to connect the elongated body to the main body.

7. The animal collar of claim 1 wherein at least one connector is provided connected to either the main body or the elongated body so as to connect the elongated body to the main body.

8. The animal collar of claim 1 wherein the collar includes a connector allowing for connection of an auxiliary leash to the collar.

9. The animal collar of claim 1 wherein a first position is defined when the elongated body is wrapped around the outer surface of the main body, the first position further defined when a free end of the elongated body is connected to the main body.

10. The animal collar of claim 9 wherein a second position is defined when the free end of the elongated body is disconnected from the main body, the second position further defined when the elongated body is unwrapped from the main body wherein the elongated body is capable of being used as a leash.

11. A method using the animal collar of claim 1 comprising the steps of: disconnecting a free end of the elongated body from the main body; and
   unwrapping the elongated body from the around the main body thereby allowing a user to use the elongated body as a leash.

12. The method of claim 11 further comprising the steps of:
   rewrapping the elongated body around the main body; and
   connecting the elongated body to the main body.

13. An animal collar comprising:
   a main body having an elongated body extending therefrom, the main body made of a flexible material, the elongated body directly connected to the main body;
   the main body configured to adjust around the neck of an animal; and
   the elongated body being wrappable and connectable around and to the main body thereby allowing the main body to secure and adjust around the neck of an animal, the elongated body continuously wrapped around in a single direction and connected to the main body in a first position and the elongated body unconnected and unwrapped from the main body thus allowing the elongated body to be used as a leash.

14. The animal collar of claim 13 wherein an adjustment mechanism is provided to allow the main body to be adjustable.

15. The animal collar of claim 14 wherein a slide is provided fixedly connected to the main body, the slide positioned adjacent to the adjustment mechanism so as to prevent choking of the animal when the elongated body is in a use position.

16. The animal collar of claim 13 wherein the distal end of the elongated body includes the holding portion provided thereon.

17. The animal collar of claim 16 wherein a first connector is provided connected to the holding portion, the first connector configured to connect the elongated body to the main body.

18. The animal collar of claim 17 wherein a second connector is provided connected to the main body, the second connector configured to connect the elongated body to the main body.

19. The animal collar of claim 13 wherein at least one connector is provided connected to either the main body or the elongated body so as to connect the elongated body to the main body.

20. The animal collar of claim 13 wherein the collar includes a connector allowing for connection of an auxiliary leash to the collar.

* * * * *